US010723878B2

(12) United States Patent
Guo et al.

(10) Patent No.: US 10,723,878 B2
(45) Date of Patent: Jul. 28, 2020

(54) PREPARATION OF HIGH THERMALLY CONDUCTIVE POLYMER COMPOSITIONS AND USES THEREOF

(71) Applicant: SABIC Global Technologies B.V., Bergen op Zoom (NL)

(72) Inventors: Mingcheng Guo, Shanghai (CN); Yaqin Zhang, Shanghai (CN); Yubin Bao, Shanghai (CN)

(73) Assignee: SABIC Global Technologies B.V., Bergen op Zoom (NL)

(*) Notice: Subject to any disclaimer, the term of this patent is extended or adjusted under 35 U.S.C. 154(b) by 174 days.

(21) Appl. No.: 15/546,749

(22) PCT Filed: Jan. 21, 2016

(86) PCT No.: PCT/IB2016/050301
§ 371 (c)(1),
(2) Date: Jul. 27, 2017

(87) PCT Pub. No.: WO2016/120760
PCT Pub. Date: Aug. 4, 2016

(65) Prior Publication Data
US 2019/0062552 A1 Feb. 28, 2019

Related U.S. Application Data

(60) Provisional application No. 62/109,283, filed on Jan. 29, 2015.

(51) Int. Cl.
| | | |
|---|---|---|
| C08L 71/12 | (2006.01) | |
| C08K 3/04 | (2006.01) | |
| C08K 3/22 | (2006.01) | |
| C08L 77/02 | (2006.01) | |

(52) U.S. Cl.
CPC ............ C08L 71/12 (2013.01); C08K 3/04 (2013.01); C08K 3/22 (2013.01); C08L 77/02 (2013.01)

(58) Field of Classification Search
USPC ........................................... 524/496
See application file for complete search history.

(56) References Cited

U.S. PATENT DOCUMENTS

| | | | |
|---|---|---|---|
| 8,481,624 B2 | 7/2013 | Staal et al. | |
| 8,552,101 B2 | 10/2013 | l'Abee et al. | |
| 2013/0094207 A1* | 4/2013 | Negandhi | F21V 5/04 362/235 |

FOREIGN PATENT DOCUMENTS

| | | |
|---|---|---|
| CN | 102260413 A | 11/2011 |
| EP | 0297888 A1 | 1/1989 |
| JP | 2007-031611 A | 2/2007 |
| KR | 20130088251 A | 8/2013 |
| KR | 2014-0009408 A | 1/2014 |
| KR | 20140005493 A | 1/2014 |

(Continued)

OTHER PUBLICATIONS

Online translation of Abstract/Claims/Detailed Description of CN 102260413A (Year: 2011).*

(Continued)

*Primary Examiner* — Fred M Teskin
(74) *Attorney, Agent, or Firm* — BakerHostetler (57) ABSTRACT

The present disclosure provides graphite-containing compositions that exhibit favorable thermal conductivity characteristics.

20 Claims, 3 Drawing Sheets

(56) References Cited

FOREIGN PATENT DOCUMENTS

WO     WO 2012/114309 A1     8/2012
WO     2014078760 A1     5/2014

OTHER PUBLICATIONS

Chen et al, "Non-isothermal crystallization study of in-situ exfoliated graphite filled nylon 6 composites," J. Polym. Res. (2014) 21: 417. (Year: 2014).*
Zhou, S. et al. "Innovative Fabrication of Polymer/Graphite Conductive Composites for Heat Dissipation," Society of Plastics Engineers, 2013, 10.2417/spepro.005075, pp. 1-2.
Wu, H. et al. "Preparation of Low-Density Polyethylene/Low-Temperature Expanddable Graphite Composites With High Thermal Conductivity by an in situ Expansion Melt Blending Process," Materials & Design, vol. 52, Dec. 2013, pp. 621-629.

* cited by examiner

PREPARATION OF HIGH THERMALLY CONDUCTIVE POLYMER COMPOSITIONS AND USES THEREOF

CROSS-REFERENCE TO RELATED APPLICATIONS

This application is the National Stage of International Application No. PCT/IB2016/050301, filed Jan. 21, 2016, which claims the benefit of U.S. Provisional Application No. 62/109,283, filed Jan. 29, 2016, the disclosures of which are incorporated herein by reference in their entireties.

RELATED APPLICATION

The present application claims priority to U.S. patent application 62/109,283, "Preparation Of High Thermally Conductive Polymer Compositions And Uses Thereof" (filed Jan. 29, 2015), the entirety of which application is incorporated herein by reference for any and all purposes.

TECHNICAL FIELD

The present disclosure relates to the fields of graphite and polymeric materials.

BACKGROUND

Thermal management has received increasing awareness for certain applications, e.g., LED heat sinks. In MBB (mobile broadband), for example, heat dissipation has become more and more critical to device speed and performance. As a result, user demand improved performance from thermally conductive materials in devices, and some applications require both high thermal conductivity (TC) and good mechanical performance. Accordingly, there is a need for improved thermally conductive compositions.

SUMMARY

In meeting the described challenges, in one aspect the present disclosure provides compositions comprising: (a) from about 20 wt % (weight percent) to about 99 wt % of one or more resins, e.g., thermoplastic polymers; (b) from about 0.5 to about 50 wt % expandable graphite platelets, the expandable graphite platelets having a thickness of greater than about 1 micrometer; and (c) from about 0 wt % to about 60 wt % of one or more additives, the percentages by weight being based in each case on the total weight of components (a), (b), and (c) and together giving 100 wt %.

In another aspect the present disclosure provides molded articles, comprising from about 20 wt % to about 99 wt % of one or more resins, e.g., thermoplastic polymers; from about 0.5 to about 50 wt % expandable graphite platelets, the expandable graphite platelets having a thickness of greater than about 1 micrometer; and from about 0 wt % to about 60 wt % of one or more additives, the molded article also having an in-plane thermal conductivity in the range of from about 1.0 to about 30 W/mK (watts/meter/degree Kelvin), the percentages by weight being based in each case on the total weight of components (a), (b), and (c), and together giving 100 wt %.

The present disclosure also provides methods of preparing a composition, comprising (a) from about 20 wt % to about 99 wt % of one or more resins, e.g., thermoplastic polymers; (b) from about 0.5 to about 50 wt % expandable graphite platelets, the expandable graphite platelets having a thickness of greater than about 1 micrometer; and (c) from about 0 wt % to about 60 wt % of one or more additives, the method comprising mixing in an extruder melts of (a), (b), and (c), wherein at least a portion of (b) is provided to the extruder at a point beyond which—when viewed in the conveying direction—the extruder comprises one or more shearing elements, and the percentages by weight being based in each case on the total weight of components (a), (b), and (c), and together giving 100 wt %.

The disclosure also provides method of using a thermoplastic composition, comprising contacting a composition according to the present disclosure to an elevated temperature.

Additionally provided are methods of using molded articles, comprising contacting a molded article according to the present disclosure to an elevated temperature.

BRIEF DESCRIPTION OF THE DRAWINGS

The summary, as well as the following detailed description, is further understood when read in conjunction with the appended drawings. For the purpose of illustrating the invention, there are shown in the drawings exemplary embodiments of the invention; however, the invention is not limited to the specific methods, compositions, and devices disclosed. In addition, the drawings are not necessarily drawn to scale. In the drawings.

DETAILED DESCRIPTION OF ILLUSTRATIVE EMBODIMENTS

The present invention can be understood more readily by reference to the following detailed description taken in connection with the accompanying FIGS. and examples, which form a part of this disclosure. It is to be understood that this invention is not limited to the specific devices, methods, applications, conditions or parameters described and/or shown herein, and that the terminology used herein is for the purpose of describing particular embodiments by way of example only and is not intended to be limiting of the claimed invention. Also, as used in the specification including the appended claims, the singular forms "a," "an," and "the" include the plural, and reference to a particular numerical value includes at least that particular value, unless the context clearly dictates otherwise. The term "plurality", as used herein, means more than one. When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable. Unless specified to the contrary herein, all test standards are the most recent standard in effect at the time of filing this application. Except where noted, it should be understood that the combined weight percent value of all components does not exceed about 100 wt %, and all weight percent values are based on the total weight of the composition. A value modified by a term or terms, such as "about" and/or "substantially," is intended to include the degree of error associated with measurement of the particular quantity based upon the equipment available at the time of filing this application.

It is to be appreciated that certain features of the invention which are, for clarity, described herein in the context of separate embodiments, can also be provided in combination in a single embodiment. Conversely, various features of the invention that are, for brevity, described in the context of a single embodiment, can also be provided separately or in any combination. Further, reference to values stated in ranges includes each and every value within that range. Any documents cited herein are incorporated herein by reference in their entireties for any and all purposes.

To prepare thermally conductive materials, one may use a variety of thermally conductive fillers and resins. One or more high thermally conductive, electrically insulative fillers can be used as additives. The thermally conductive filler has an intrinsic thermal conductivity greater than or equal to 50 W/mK. In some instances, the material may also have a resistivity greater than or equal to $10^5$ Ohm-cm.

Examples of high thermally conductive, electrically insulative filler include, but are not limited to, AlN (aluminum nitride), BN (boron nitride), $MgSiN_2$ (magnesium silicon nitride), SiC (Silicon carbide), $Al_2O_3$ (Aluminum oxide), $Si_3N_4$ (Silicon nitride), ceramic-coated graphite, and combinations thereof. It should be understood that the disclosed compositions may include one or more of the foregoing, but may also be free or one or more of the foregoing. Other suitable high thermally conductive fillers include graphite, expanded graphite, graphene, carbon fiber, carbon nanotube (CNT), graphitized carbon black, or a combination thereof. Such fillers suitable have thermal conductivities of more than about 50 W/mK, e.g., from 50-60 W/mK, from 50-70 W/mK, from 50-80 W/mK, from 50-90 W/mK, from 50-100 W/mK, up to about 100 W/mK, up to about 500 W/mK, or greater.

Exemplary low-thermal conductive fillers include ZnS (Zinc sulfide), CaO (Calcium oxide), MgO (Magnesium oxide), ZnO (Zinc oxide), or $TiO_2$ (Titanium dioxide), $Al_4C_3$ (Aluminum carbide), AlON (Aluminum oxynitride) or a combination thereof. Such fillers suitably have thermal conductivities in the range of from about 0.0001 to about 30 W/mK, or from about 10 to about 20 W/mK.

The compositions may also include one or more thermally insulative fillers as additives. Some such fillers include, e.g., $H_2Mg_3(SiO_3)_4$ (talc), $CaCO_3$, $Mg(OH)_2$, Mica, BaO, r-AlO(OH) (boehmite), $Al(OH)_3$, $BaSO_4$, $CaSiO_3$, $ZrO2$, $SiO_2$, glass bead, glass fiber, $MgO.xAl_2O_3$ (Magnesium aluminate), $CaMg(CO_3)_2$ (dolomite), clay, $CaSO_4$ (including whisker form) and combinations thereof.

Suitable resins include thermosets and thermoplastics, including amorphous and crystalline thermoplastics resins. In some embodiments, crystalline polymeric resins are preferred as the base resin of the thermally conductive compositions because of their relatively higher intrinsic thermal conductivity over amorphous resin, like nylon, PPS and also because of their reduced sensitivity to fillers during compounding. In some embodiments, amorphous thermoplastics, such as polycarbonate, are useful when compared to crystalline polymers on account of improved dimensional stability.

In one aspect, the thermoplastic polymer used in the compositions of the invention is an organic polymer. In this aspect, the organic polymer is selected from a wide variety of thermoplastic resins or blends of thermoplastic resins. The thermoplastic polymer also includes blends of one or more thermoplastic resins with one or more thermosetting resins. The thermoplastic polymer can also be a blend of polymers, copolymers, terpolymers, or combinations including at least one of the foregoing organic, polymers. In one aspect, examples of the organic polymer are polyethylene (PE), including high-density polyethylene (HDPE), linear low-density polyethylene (LLDPE), low-density polyethylene (LDPE), mid-density polyethylene (MDPE), glycidyl methacrylate modified polyethylene, maleic anhydride functionalized polyethylene, maleic anhydride functionalized elastomeric ethylene copolymers (like EXXELOR VA1801™ and VA1803™ from ExxonMobil), ethylene-butene copolymers, ethylene-octene copolymers, ethylene-acrylate copolymers, such as ethylene-methyl acrylate, ethylene-ethyl acrylate, and ethylene butyl acrylate copolymers, glycidyl methacrylate functionalized ethylene-acrylate terpolymers, anhydride functionalized ethylene-acrylate polymers, anhydride functionalized ethylene-octene and anhydride functionalized ethylene-butene copolymers, polypropylene (PP), maleic anhydride functionalized polypropylene, glycidyl methacrylate modified polypropylene, polyacetals, polyacrylics, polycarbonates, polystyrenes, polyesters, polyamides, polyamideimides, polyarylates, polyarylsulfones, polyethersulfones, polyphenylene sulfides, polyvinyl chlorides, pulysulfones, polyimides, polyetherimides, polytetrafluoroethylenes, pulyetherketones, polyether etherketones, polyether ketone ketones, polybenzoxazoles, polyoxadiazoles, polybenzothiazinophenothiazines, polybenzothiazoles, polypyrazinoquinoxalines, polypyromellitimides, polyquinoxalines, polybenzimidazoles, polyoxindoles, polyoxoiscindolines, polydioxoisoindolines, polytriazines, polypyridazines, polypiperazines, polypyridines, polypiperidines, polytriaxoles, polypyrazoles, polypyrrolidines, polycarboranes, polyoxabicyclononanes, polydibenzofurans, polyphthalides, polyacetals, polyanhydrides, polyvinyl ethers, polyvinyl thioethers, polyvinyl alcohols, polyvinyl ketones, polyvinyl halides, polyvinyl nitriles, polyvinyl esters, polysulfonates, polysulfides, polythioesters, polysulfones, polysulfonamides, polyureas, polyphosphates, polysilazanes, polyurethanes, or the like, or a combination including at least one of the foregoing organic polymers.

Specific non-limiting examples of blends of thermoplastic resins include acrylonitrile-butadiene-styrene/nylon, polycarbonate/acrylonitrile-butadiene-styrene, polyphenylene ether/polystyrene, polyphenylene ether/polyamide, polycarbonate/polyester, polyphenylene ether/polyolefin, and combinations including at least one of the foregoing blends of thermoplastic resins.

In one embodiment, an organic polymer that can be used in the conductive composition is a polyarylene ether. The term poly(arylene ether)polymer includes polyphenylene ether (PPE) and poly(arylene ether)copolymers; graft copolymers; poly(arylene ether)ionomers; and block copolymers of alkenyl aromatic compounds with poly(arylene ether)s, vinyl aromatic compounds, and poly(arylene ether), and the like; and combinations including at least one of the foregoing.

Poly(arylene ether) may have a number average molecular weight of about 3,000 to about 30,000 g/mole (grams/mole) and a weight average molecular weight of about 30,000 to about 60,000 g/mole, as determined by gel permeation chromatography. The poly(arylene ether) can have an intrinsic viscosity of about 0.10 to about 0.60 deciliters per gram (dl/g), as measured in chloroform at 25 degree C.

It is also possible to utilize a high intrinsic viscosity poly (arylene ether) and a low intrinsic viscosity poly(arylene ether) in combination. Determining an exact ratio, when two intrinsic viscosities are used, will depend somewhat on the exact intrinsic viscosities of the poly(arylene ether) used and the ultimate physical properties that are desired. Particularly useful poly(arylene ether)s for many purposes are those which include molecules having at least one aminoalkyl-containing end group. The aminoalkyl radical is typically located in an ortho position to the hydroxy group. Products containing such end groups can be obtained by incorporating an appropriate primary or secondary monoamine such as di-n-butylamine or dimethylamine as one of the constituents of the oxidative coupling reaction mixture.

In another embodiment, the organic polymer used is a polycarbonate. Polycarbonates, including aromatic carbonate chain units, include compositions having structural units of the formula (II):

(II)

in which the $R^1$ groups are aromatic, aliphatic or alicyclic radicals. Preferably, $R^1$ is an aromatic organic radical, e.g., a radical of the formula (III):

(III)

wherein each of $A_1$ and $A_2$ is a monocyclic divalent aryl radical and Y1 is a bridging radical having zero, one, or two atoms which separate A1 from A2. In an exemplary embodiment, one or more atoms separate A1 from A2. Illustrative examples of radicals of this type are —O—, —S—, —S(O)—, —S(O$_2$)—, —C(O)—, methylene, cyclohexylmethylene, 2-[2,2,1,]-bicycloheptylidene, ethylidene, isopropylidene, neopentylidene, cyclohexylidene, cyclopentadecylidene, cyclododecylidene, adamantylidene, or the like. In another embodiment, zero atoms separate A1 from A2, with an illustrative example being bisphenol. The bridging radical Y1 can be a hydrocarbon group or a saturated hydrocarbon group such as methylene, cyclohexylidene or isopropylidene.

Polycarbonates can be produced by the interfacial reaction polymer precursors such as dihydroxy compounds in which only one atom separates A1 and A2. As used herein, the term "dihydroxy compound" includes, for example, bisphenol compounds having general formula (IV) as follows:

(IV)

wherein $R^a$ and $R^b$ each independently represent hydrogen, a halogen atom, or a monovalent hydrocarbon group; p and q are each independently integers from 0 to 4; $X^a$ represents one of the groups of formula (V):

(V)

wherein $R^c$ and $R^d$ each independently represent a hydrogen atom or a monovalent linear or cyclic hydrocarbon group, and $R^e$ is a divalent hydrocarbon group.

Examples of the types of bisphenol compounds that can be represented by formula (IV) include the bis(hydroxyaryl)alkane series. Other bisphenol compounds that can be represented by formula (IV) include those where X is —O—, —S—, —SO— or —SO22-. Other bisphenol compounds that can be utilized in the polycondensation of polycarbonate are represented by the formula (VI)

(VI)

wherein, $R^f$, is a halogen atom of a hydrocarbon group having 1 to 10 carbon atoms or a halogen substituted hydrocarbon group; n is a value from 0 to 4. When n is at least 2, $R^f$ can be the same or different. Examples of bisphenol compounds represented by formula (V), are resorcinol, substituted resorcinol compounds such as 3-methyl resorcin, and the like.

Bisphenol compounds (e.g., bisphenol A), such as 2,2,2', 2'-tetrahydro-3,3,3',3'-tetramethyl-1,1'-spirobi-[IH-idene]-6, 6'-diol represented by the following formula (VII) can also be used.

(VII)

Branched polycarbonates, as well as blends of linear polycarbonate and a branched polycarbonate can also be used. Branched polycarbonates can be prepared by adding a branching agent during polymerization. These branching agents can include polyfunctional organic compounds containing at least three functional groups, which can be hydroxyl, carboxyl, carboxylic anhydride, haloformyl, and combinations including at least one of the foregoing branching agents. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl)alpha,alpha-dimethyl benzyl) phenol), 4-chloroformyl phthalic anhydride, trimesic acid, benxophenone tetracarboxylic acid, or the like, or combinations including at least one of the foregoing branching agents. The branching agents can be added at a level of about 0.05 to about 2.0 weight percent (wt %), based upon the total weight of the polycarbonate in a given layer.

In one embodiment, the polycarbonate can be produced by a melt polycondensation reaction between a dihydroxy compound and a carbonic acid diester. Preferably, the number average molecular weight of the polycarbonate is about 3,000 to about 1,000,000 grams/mole (g/mole). Within this range, it is desirable to have a number average molecular weight of greater than or equal to about 10,000, preferably greater than or equal to about 20,000, and more preferably greater than or equal to about 25,000 g/mole. Also desirable is a number average molecular weight of less than or equal to about 100,000, preferably less than or equal to about 75,000, more preferably less than or equal to about 50,000, and most preferably less than or equal to about 35,000 g/mole.

Cycloaliphatic polyesters can also be used in the conductive composition, and are generally prepared by reaction of organic polymer precursors such as a diol with a dibasic acid or derivative.

Polyester polymers are also suitable, and may be obtained through the condensation or ester interchange polymerization of the polymer precursors such as diol or diol chemical equivalent component with the diacid or diacid chemical equivalent component and having recurring units of the formula (VII):

(VIII)

wherein $R^3$ represents an alkyl or cycloalkyl radical containing 2 to 12 carbon atoms and which is the residue of a straight chain, branched, or cycloaliphatic alkane diol having 2 to 12 carbon atoms or chemical equivalents thereof; and R.sup.4 is an alkyl or a cycloaliphatic radical which is the decarboxylated residue derived from a diacid, with the proviso that at least one of $R^3$ and $R^4$ is a cycloalkyl group.

A preferred cycloaliphatic polyester is poly(1,4-cyclohexane-dimethanol-1,4-cyclohexanedicarboxylate) having recurring units of formula (IX):

(IX)

wherein in the formula (VIII), $R^3$ is a cyclohexane ring, and wherein $R^4$ is a cyclohexane ring derived from cyclohexanedicarboxylate or a chemical equivalent thereof and is selected from the cis- or trans-isomer or a mixture of cis- and trans-isomers thereof. Cycloaliphatic polyester polymers can be generally made in the presence of a suitable catalyst such as a tetra(2-ethyl hexyl)titanate, in a suitable amount, typically about 50 to 400 ppm of titanium based upon the total weight of the final product. Poly(1,4-cyclohexanedimethanol-1,4-cyclohexanedicarboxylate) generally forms a suitable blend with the polycarbonate. Aromatic polyesters or polyarylates can also be used in the conductive compositions.

Preferably, the number average molecular weight of the copolyestercarbonates or the polyesters is about 3,000 to about 1,000,000 g/mole. Within this range, it is desirable to have a number average molecular weight of greater than or equal to about 10,000, preferably greater than or equal to about 20,000, and more preferably greater than or equal to about 25,000 g/mole. Also desirable is a number average molecular weight of less than or equal to about 100,000, preferably less than or equal to about 75,000, more preferably less than or equal to about 50,000, and most preferably less than or equal to about 35,000 g/mole.

In another embodiment, the organic polymers include polystyrene. The term "polystyrene" as used herein includes polymers prepared by bulk, suspension and emulsion polymerization, which contain at least 25% by weight of polymer precursors having structural units derived from a monomer of the formula (X):

(X)

wherein $R^5$ is hydrogen, lower alkyl or halogen $Z^1$ is vinyl, halogen or lower alkyl; and p is from 0 to about 5. These organic polymers include homopolymers of styrene, chlorostyrene and vinyltoluene, random copolymers of styrene with one or more monomers illustrated by acylonitrile, butadiene, alpha-methylstyrene, ethylvinylbenzene, divinylbenzene and maleic anhydride, and rubber-modified polystyrenes including blends and grafts, wherein the rubber is a polybutadiene or a rubbery copolymer of about 98 to about 70 wt % styrene and about 2 to about 30 wt % diene monomer. Polystyrenes are miscible with polyphenylene ether in all proportions, and any such blend can contain polystyrene in amounts of about 5 to about 95 wt % and most often about 25 to about 75 wt %, based on the total weight of the polymers.

In yet another embodiment, polyimides can be used as the organic polymers in the conductive compositions. Useful thermoplastic polyimides have the general formula (XI)

(XI)

wherein a is greater than or equal to about 10, and more preferably greater than or equal to about 1000; and wherein V is a tetravalent linker without limitation, as long as the linker does not impede synthesis or use of the polyimide. Suitable linkers include (a) substituted or unsubstituted, saturated, unsaturated or aromatic monocyclic and polycyclic groups having about 5 to about 50 carbon atoms, (b) substituted or unsubstituted, linear or branched, saturated or unsaturated alkyl groups having 1 to about 30 carbon atoms; or combinations thereof. Suitable substitutions and/or linkers include, but are not limited to, ethers, epoxides, amides, esters, and combinations thereof. Preferred linkers include but are not limited to tetravalent aromatic radicals of formula (XII), such as

(XII)

wherein W is a divalent moiety selected from the group consisting of —O—, —S—, —C(O)—, —SO$_2$—, —SO—, —C$_y$H$_{2y}$— (y being an integer from 1 to 5), and halogenated derivatives thereof, including perfluoroalkylene groups, or a group of the formula —O—Z—O— wherein the divalent bonds of the —O— or the —O—Z—O— group are in the 3,3',3,4',4,3', or the 4,4' positions, and wherein Z includes, but is not limited, to divalent radicals of formula (XIII).

(XII)

R in formula (XI) includes substituted or unsubstituted divalent organic radicals such as (a) aromatic hydrocarbon radicals having about 6 to about 20 carbon atoms and halogenated derivatives thereof; (b) straight or branched chain alkylene radicals having about 2 to about 20 carbon atoms; (c) cycloalkylene radicals having about 3 to about 20 carbon atoms, or (d) divalent radicals of the general formula (XIV)

(XIV)

wherein Q includes a divalent moiety selected from the group consisting of —O—, —S—, —C(O)—, —SO$_2$—, —SO—, —C$_y$H$_{2y}$— (y being an integer from 1 to 5), and halogenated derivatives thereof, including perfluoroalkylene groups.

Preferred classes of polyimides that can be used in the conductive compositions include polyamidimides and polyetherimides, particularly those polyetherimides that are melt processable.

Preferred polyetherimide polymers include more than 1, preferably about 10 to about 1000 or more, and more preferably about 10 to about 500 structural units, of the formula (XV)

(XV)

wherein T is —O— or a group of the formula —O—Z—O— wherein the divalent bonds of the —O— or the —O—Z—O— group are in the 3,3',3,4',4,3', or the 4,4' positions, and wherein Z includes, but is not limited, to divalent radicals of formula (XIII) as defined above.

In one embodiment, the polyetherimide can be a copolymer, which, in addition to the etherimide units described above, further contains polyimide structural units of the formula (XVI)

(XVI)

wherein R is as previously defined for formula (XI) and M includes, but is not limited to, radicals of formula (XVII).

(XVII)

-continued

The polyetherimide can be prepared by any of the methods including the reaction of an aromatic bis(ether anhydride) of the formula (XVIII)

(XVIII)

with an organic diamine of the formula (XIX)

$$H_2N-R-NH_2 \quad (XIX)$$

wherein T and R are defined as described above in formulas (XI) and (XIV).

Illustrative examples of aromatic bis(ether anhydride)s of formula (XVIII) include 2,2-bis[4-(3,4-dicarboxyphenoxy)phenyl]propane dianhydride; 4,4'-bis(3,4-dicarboxyphenoxy)diphenyl ether dianhydride; 4,4'-bis(3,4-dicarboxyphenoxy)diphenyl sulfide dianhydride; 4,4'-bis(3,4-dicarboxyphenoxy)benzophenone dianhydride; 4,4'-bis(3,4-dicarboxyphenoxy)diphenyl sulfone dianhydride; 2,2-bis[4-(2,3-dicarboxyphenoxy)phenyl]propane dianhydride; 4,4'-bis(2,3-dicarboxyphenoxy)diphenyl ether dianhydride; 4,4'-bis(2,3-dicarboxyphenoxy)diphenyl sulfide dianhydride; 4,4'-bis(2,3-dicarboxyphenoxy)benzophenone dianhydride; 4,4'-bis(2,3-dicarboxyphenoxy)diphenyl sulfone dianhydride; 4-(2,3-dicarboxyphenoxy)-4-(3,4-dicarboxyphenoxy)diphenyl-2,2-propane dianhydride; 4-(2,3-dicarboxyphenoxy)-4-(3,4-dicarboxyphenoxy)diphenyl ether dianhydride; 4-(2,3-dicarboxyphenoxy)-4'-(3,4-dicarboxyphenoxy)diphenyl sulfide dianhydride; 4-(2,3-dicarboxyphenoxy)-4'-(3,4-dicarboxyphenoxy)benzophenone dianhydride and 4-(2,3-dicarboxyphenoxy)-4'-(3,4-dicarboxyphenoxy)diphenyl sulfone dianhydride, as well as various mixtures thereof.

One preferred class of aromatic bis(ether anhydride)s included by formula (XVIII) above includes, but is not limited to, compounds wherein T is of the formula (XX)

(XX)

and the ether linkages, for example, are preferably in the 3,3',3,4', 4,3', or 4,4' positions, and mixtures thereof, and where Q is as defined above. Any diamino compound can be employed in the preparation of the polyimides and/or polyetherimides. The preferred diamino compounds are aromatic diamines, especially m- and p-phenylenediamine and mixtures thereof.

In an exemplary embodiment, the polyetherimide resin includes structural units according to formula (XV) wherein each R is independently p-phenylene or m-phenylene or a mixture thereof and T is a divalent radical of the formula (XXI)

(XXI)

In general, the reactions can be carried out employing solvents such as o-dichlorobenzene, m-cresol/toluene, or the like, to effect a reaction between the anhydride of formula (XVIII) and the diamine of formula (XIX), at temperatures of about 100 degrees C. to about 250 degrees C. Alternatively, the polyetherimide can be prepared by melt polymerization of aromatic bis(ether anhydride)s of formula (XVIII) and diamines of formula (XIX) by heating a mixture of the starting materials to elevated temperatures with concurrent stirring. Generally, melt polymerizations employ temperatures of about 200 degrees C. to about 400 degrees C. Chain stoppers and branching agents can also be employed in the reaction. When polyetherimide/polyimide copolymers are employed, a dianhydride, such as pyromellitic anhydride, is used in combination with bis(ether anhydride). The polyetherimide polymers can optionally be prepared from reaction of an aromatic bis(ether anhydride) with an organic diamine in which the diamine is present in the reaction mixture at no more than about 0.2 molar excess, and preferably less than about 0.2 molar excess. Under such conditions the polyetherimide resin has less than about 15 microequivalents per gram (mu eq/g) acid titratable groups, and preferably less than about 10 (mu eq/g) acid titratable groups, as shown by titration with chloroform solution with a solution of 33 weight percent (wt %) hydrobromic acid in glacial acetic acid. Acid-titratable groups are due to amine end-groups in the polyetherimide resin.

Generally, useful polyetherimides have a melt index of about 0.1 to about 10 grams per minute (g/min) (grams/minute), as measured by American Society for Testing Materials (ASTM) D1238 at 295 degrees C., using a 6.6 kilogram (kg) weight. In a preferred embodiment, the polyetherimide resin has a weight average molecular weight (Mw) of about 10,000 to about 150,000 grams per mole (g/mole), as measured by gel permeation chromatography, using a polystyrene standard. Such polyetherimide polymers typically have an intrinsic viscosity greater than about 0.2 deciliters per gram (dl/g), preferably about 0.35 to about 0.7 dl/g measured in m-cresol at 25 degrees C.

Polyamides can be used as the organic polymers in the conductive composition. Polyamides are generally derived from the polymerization of organic lactams having from 4 to 12 carbon atoms. Preferred lactams are represented by the formula (XXII)

(XXII)

wherein n is about 3 to about 11. A highly preferred lactam is epsilon-caprolactam having n equal to 5.

Polyamides can also be synthesized from amino acids having from 4 to 12 carbon atoms. Preferred amino acids are represented by the formula (XXIII)

(XXIII)

wherein n is about 3 to about 11. A highly preferred amino acid is epsilon-aminocaproic acid, with n equal to 5.

Polyamides can also be polymerized from aliphatic dicarboxylic acids having from 4 to 12 carbon atoms and aliphatic diamines having from 2 to 12 carbon atoms. Suitable and preferred aliphatic dicarboxylic acids are the same as those described above for the synthesis of polyesters. Preferred aliphatic diamines are represented by the formula (XXIV) $H_2N—(CH_2)_n—NH_2$ (XXIV) wherein n is about 2 to about 12. A highly preferred aliphatic diamine is hexamethylenediamine ($H_2N(CH_2)_6NH_2$). It is preferred that the molar ratio of the dicarboxylic acid to the diamine be about 0.66 to about 1.5. Within this range it is generally desirable to have the molar ratio be greater than or equal to about 0.81, preferably greater than or equal to about 0.96. Also desirable within this range is an amount of less than or equal to about 1.22, preferably less than or equal to about 1.04. The preferred polyamides are nylon 6, nylon 6,6, nylon 4,6, nylon 6, 12, nylon 10, or the like, or combinations including at least one of the foregoing nylons.

Synthesis of polyamideesters can also be accomplished from aliphatic lactones having from 4 to 12 carbon atoms and aliphatic lactams having from 4 to 12 carbon atoms. The aliphatic lactones are the same as those described above for polyester synthesis, and the aliphatic lactams are the same as those described above for the synthesis of polyamides. The ratio of aliphatic lactone to aliphatic lactam can vary widely depending on the desired composition of the final copolymer, as well as the relative reactivity of the lactone and the lactam. A presently preferred initial molar ratio of aliphatic lactam to aliphatic lactone is about 0.5 to about 4. Within this range a malar ratio of greater than or equal to about 1 is desirable. Also desirable is a molar ratio of less than or equal to about 2.

The conductive precursor composition can further include a catalyst or an initiator. Generally, any known catalyst or initiator suitable for the corresponding thermal polymerization can be used. Alternatively, the polymerization can be conducted without a catalyst or initiator. For example, in the synthesis of polyamides from aliphatic dicarboxylic acids and aliphatic diamines, no catalyst is required.

For the synthesis of polyamides from lactams, suitable catalysts include water and the omega-amino acids corresponding to the ring-opened (hydrolyzed) lactam used in the synthesis. Other suitable catalysts include metallic aluminum alkylates ($MAl(OR)_3H$; wherein M is an alkali metal or alkaline earth metal, and R is C.sub.1-C.sub.12 alkyl), sodium dihydrobis(2-methoxyethoxy)aluminate, lithium dihydrobis(tert-butoxy)aluminate, aluminum alkylates ($Al(OR)_2R$; wherein R is $C_1$-$C_{12}$ alkyl), N-sodium caprolactam, magnesium chloride or bromide salt of epsilon-caprolactam ($MgXC_6H_{10}NO$, X—Br or Cl), dialkoxy aluminum hydride. Suitable initiators include isophthaloybiscaprolactam, N-acetalcaprolactam, isocyanate epsilon-caprolactam adducts, alcohols (ROH; wherein R is $C_1$-$C_{12}$ alkyl), diols (HO—R—OH; wherein R is R is $C_1$-$C_{12}$ alkylene), omega-aminocaproic acids, and sodium methoxide.

The polyamides can also be semi-aromatic polyamides, such as PA4, PA6, or PA9 polyamides. As used herein, a "semi-aromatic polyamide" is understood to be a polyamide homo- or copolymer that contains aromatic or semi-aromatic units derived from an aromatic dicarboxylic acid, an aromatic diamine, or an aromatic aminocarboxylic acid, the content of said units being at least 50 mol %. In some cases these semi-aromatic polyamides are blended with small amounts of aliphatic polyamides for better processability. They are available commercially, from e.g., DuPont, Wilmington, Del., USA as Zytel HTN™; Solvay Advanced Polymers as Amodel™; or from DSM, Sittard, The Netherlands as Stanyl™ For Tii.

For synthesis of polyamideesters from lactones and lactams, suitable catalysis include metal hydride compounds, e.g., lithium aluminum hydride catalysts having the formula $LiAl(H)_x(R^1)_y$, where x is about 1 to about 4, y is about 0 to about 3, x+y is equal to 4, and $R^1$ is selected from the group consisting of $C_1$-$C_{12}$ alkyl and $C_1$-$C_{12}$ alkoxy; highly preferred catalysts include $LiAl(H)(OR_2)_3$; wherein $R^2$ is selected from the group consisting of $C_1$-$C_{12}$ alkyl, e.g., $LiAl(H)(OC(CH_3)_3)_3$. Other suitable catalysts and initiators include those described above for the polymerization of poly(epsilon-caprolactam) and poly(epsilon-caprolactone).

The high molecular weight polyesters used in the practice of the present invention are polymeric diol or glycol esters of terephthalic acid and/or isophthalic acid. They are widely available commercially, e.g., SABIC Innovative Plastics, Pittsfield, Mass., USA, poly(1,4-butylene terephthalate) resins as VALOX™ Goodyear Tire and Rubber Company, USA, poly(ethylene terephthalate) as VITUF™, and PCT (polycyclohexylterephthalate), a high-temperature polyester available commercially from Eastman Chemical Co., Kingsport, Tenn., USA and DuPont, Wilmington, Del., USA. Otherwise they can be readily prepared by known techniques, such as by the alcoholysis of esters of terephthalic and/or isophthalic acid with a glycol and subsequent polymerization, by heating glycols with free acids or with halide derivatives thereof, and similar processes. These are described in U.S. Pat. Nos. 2,465,319 and 3,047,539, and elsewhere.

Although the glycol portion of the polyester can contain from 2 to 10 atoms, it is preferred that it contain from 2 to 4 carbon atoms in the form of linear methylene chains.

Polyesters may be in the family of high molecular weight polymeric glycol terephthalates or isophthalates having repeating units of the general formula (XXV)

(XXV)

wherein n is from 2 to 4. Also suitable are ester mixtures, including copolyesters of terephthalic and isophthalic acids of up to 30 mole percent isophthalic units.

Especially preferred polyesters are poly(ethylene terephthalate) and poly(1,4-butylene terephthalate). Special mention is made of the latter because it crystallizes at such a good rate that it can be used for injection molding without the need for nucleating agents or long cycles, as is sometimes necessary with poly(ethylene terephthalate).

Illustratively, high molecular weight polyesters, such as poly(1,4-butylene terephthalate), will have an intrinsic viscosity of at least about 0.7 deciliters/gram and, preferably, at least 0.8 deciliters/gram as measured in a 60:40 phenol tetrachlorethane mixture at 30 degrees C. At intrinsic viscosities of at least about 1.0 deciliters/gram, there is further enhancement of toughness of the present compositions.

The copolyesters useful for the present compositions are preferably prepared from terephthalic acid, isophthalic acid, or reactive derivatives thereof, or any combination of the foregoing, and a glycol, which can be a straight or branched chain aliphatic and/or cycloaliphatic glycol. Illustratively, the glycol will be ethylene glycol; 1,4-butanediol; 1,5-pentanediol; 1,6-hexanediol; 1,9-nonanediol; 1,10-decanediol; neopentyl glycols; 1,4-cyclohexanediol; 1,4-cyclohexane dimethanol; a mixture of any of the foregoing, or the like. Additionally, other dicarboxylic acids useful for the acid component of the copolyesters include, without limitation, aromatic dicarboxylic acids such as napthalene dicarboxylic acid, and compounds of the formula (XXVI)

(XXVI)

in which X can be alkylene or alkylidene of from 1 to 4 carbon atoms, carbonyl, sulfonyl, oxygen or a bond between the benzene rings, and the like, and aliphatic dicarboxylic acids having from 6 to 12 carbon atoms in the chain including suberic acid, sebacic acid, azelaic acid, adipic acid and the like.

The foregoing copolyesters can be prepared by ester interchange in accordance with standard procedures. These copolyesters can preferably be derived from at least 50% poly(1,4-butylene terephthalate) units.

Also useful for the compositions of the present invention are block copolyesters derived from blocks of (i) terminally-reactive poly(1,4-butylene terephthalate), preferably of low molecular weight, and (ii) terminally-reactive copolyesters, as described above, or (iii) a terminally-reactive aliphatic polyester, or any combination thereof. The terminal groups can include hydroxyl, carboxyl, carboalkoxy, and the like, including reactive derivatives thereof.

Generally, these block copolyesters can be prepared by reacting the aforementioned terminally-reactive units in the presence of a catalyst for transesterification, such as zinc acetate, manganese acetate, titanium esters and the like. After initial mixing polymerization is carried out under standard conditions, e.g., 220 degrees to 280 degrees C., in a high vacuum e.g., 0.1 to 2 mm (millimeters) Hg, to form the block copolymer of minimum randomization in terms of distribution of chain segments. These block copolyesters are described in U.S. patent application Ser. No. 752,325, incorporated herein by reference.

Preferably, the copolyester units (ii) are derived from an aliphatic glycol and a mixture of aromatic and aliphatic dibasic acids in which the mole ratio concentration of aromatic to aliphatic acids is from 1 to 9 to about 9 to 1, with an especially preferred range being from about 3 to 7 to about 7 to 3.

Further, the terminally-reactive aliphatic polyester units (iii) will contain substantially stoichiometric amounts of the aliphatic diol and the aliphatic dicarboxylic acid, although hydroxy-containing terminal groups are preferred.

In addition, to their ease of formation by well-known procedures, both the aromatic/aliphatic copolyesters (ii) and the aliphatic polyesters (iii) are commercially available. One source for such materials is the Ruco Division/Hooker Chemical Company, Hicksville, N.Y., which designates its compounds as "Rucoflex™".

In general, the block copolyesters useful for the invention may include from 95 to 50 parts by weight of segments of poly(1,4-butylene terephthalate). Those poly(1,4-butylene terephthalate) blocks, before incorporation into the block copolyester, may have an intrinsic viscosity of above 0.1 dl/g, and more preferably, between 0.1 to 0.5 dl/g, as measured in a 60:40 mixture of phenol tetrachlorethane at 30 degrees C. The balance, 50 to 5 parts by weight of the block copolyester will include blocks of copolyester (ii) and aliphatic polyester (iii) above.

As will be understood by those skilled in the art, the poly(1,4-butylene terephthalate) block can be straight chain or branched, e.g., by use of a branching component which contains at least 3 ester-forming groups. This can be a polyol, e.g., pentaerythritol, trimethylolpropane, and the like, or a polybasic acid compound, e.g., trimethyl trimesitate, and the like. Branched poly(1,4-butylene terephthalate) resins and their preparation are described in Borman, U.S. Pat. No. 3,953,404, incorporated herein by reference. Further materials are described in U.S. Pat. No. 8,552,101, incorporated herein by reference. As described elsewhere herein, the thermoplastic may be present at from about 20 wt % to about 99 wt % of the composition, or from about 22 wt % to about 95 wt %, or from about 27 wt % to about 91 wt %, or from about 30 wt % to about 84 wt %, or front about 37 wt % to about 78 wt %, or from about 41 wt % to about 69 wt %, or from about 49 wt % to about 57 wt %.

To enhance thermal conductivity, one or more fillers may be used. Graphite is one such filler. Some producers provide expanded/exfoliated graphite, like Timcal TIMREX C-THERM™, SGL Carbon Ecophit G™, which can show higher thermal conductivity performance compared to conventional flake like graphite. A challenge with these materials, however, is compounding, as the expanded/exfoliated graphite is difficult to feed into extruders due to the material's low bulk density (e.g., 0.14~0.15 g/cc) (grams/cubic centimeter or /cm³) compared to conventional graphite density of over 0.5 g/cc.

It was discovered that expandable graphite can be used in thermally conductive compositions to prepare materials with comparatively high thermal conductivity. Expandable graphite has a bulk density similar to that of conventional flake like graphite, so the expandable graphite can be easily fed into compounding extruder, but will also expand during compounding process under normal compounding temperature. The expanded vermiform graphite may be de-gassed, dispersed and exfoliated instantaneously into melt resin. Gas generated after graphite expansion may be vented from the extruder, at one or more locations In addition to the thermoplastic polymer resin and fillers, the compositions of the present invention can include various additives ordinarily incorporated in resin compositions of this type. Mixtures of additives can be used. Such additives can be mixed at a suitable time during the mixing of the components for forming the composition. The one or more additives are included in the thermoplastic compositions to impart one or more selected characteristics to the thermoplastic compositions and any molded article made therefrom. Examples of additives that can be included in the present invention include, but are not limited to, heat stabilizers, process stabilizers, antioxidants, light stabilizers, plasticizers, antistatic agents, mold releasing agents, UV absorbers, lubricants, pigments, dyes, colorants, flow promoters, flame retardants, or a combination of one or more of the foregoing additives.

Suitable heat stabilizer include, for example, organo phosphites such as triphenyl phosphite, tris-(2,6-dimethylphenyl) phosphite, tris-(mixed mono- and di-nonylphenyl)phosphite or the like; phosphonates such as dimethylbenzene phosphonate or the like, phosphates such as trimethyl phosphate, or the like, or combinations including at least one of the foregoing heat stabilizers. Heat stabilizers are generally used in amounts of from 0.01 to 0.5 parts by weight based on 100 parts by weight of the total composition, excluding any filler.

Suitable antioxidants include, for example, organophosphites such as tris(nonyl phenyl)phosphite, tris(2,4-di-t-butylphenyl)phosphite, bis(2,4-di-t-butylphenyl)pentaerythritol diphosphite, distearyl pentaerythritol diphosphite or the like; alkylated monophenols or polyphenols; alkylated reaction products of polyphenols with dienes, such as tetrakis[methylene(3,5-di-tert-butyl-4-hydroxyhydrocinnamate)] methane, or the like; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, pentaerythrityl-tetrakis[3-(3,5-di-tert-butyl-4-hydroxyphenyl)propionate or the like; amides of beta-(3,5-di-tert-butyl-4-hydroxyphenyl)-propionix acid or the like, or combinations including at least one of the foregoing antioxidants. Antioxidants are generally used in amounts of from 0.01 to 0.5 parts by weight, based on 100 parts by weight of the total composition, excluding any filler.

Suitable light stabilizers include, for example, benzotriazoles such as 2-(2-hydroxy-5-methylphenyl)benzitriazile, 2-(2-hydroxy-5-tert-octylphenyl)-benzotriazole and 2-hydroxy-4-n-octoxy benzophenone or the like or combinations including at least one of the foregoing light stabilizers. Light stabilizers are generally used in amounts of from 0.1 to 1.0 parts by weight, based on 100 parts by weight of the total composition, excluding any filler.

Suitable plasticizers include, for example, phthalic acid esters such as dioctyl-4,5-epoxy-hexahydrophthalate, tris-(octoxycarbonylethyl)isocyanurate, tristearin, epoxidized soybean oil or the like, or combinations including at least one of the foregoing plasticizers. Plasticizers are generally used in amounts of from 0.5 to 3.0 parts by weight, based on 100 parts by weight of the total composition, excluding any filler.

Suitable antistatic agents include, for example, glycerol monostearate, sodium stearyl sulfonate, sodium dodecylbenzenesulfonate, polyether block amides, which are commercially available from, for example, BASF under the name Irgastat™; from Arkema under the name PEBAX™; and from Sanyo Chemical Industries under the name Pelestat™, or combinations of the foregoing antistatic agents. In one embodiment, carbon fibers, carbon nanofibers, carbon nanotubes, carbon black, or any combination of the foregoing can be used in a polymeric resin containing chemical antistatic agents to render the composition electrostatically dissipative.

Suitable mold releasing agents include for example, metal stearate, stearyl stearate, pentaerythritol tetrastearate, beeswax, montan wax, paraffin wax, or the like, or combinations including at least one of the foregoing mold release agents. Mold releasing agents are generally used in amounts of from 0.1 to 1.0 parts by weight, based on 100 parts by weight of the total composition, excluding any fillers.

Suitable UV absorbers include for example, hydroxybenzophenones; hydroxybenzotriazoles; hydroxybenzotriazines; cyanoacrylates; oxanilides; benzoxazinones; 2-(2H-benzotriazol-2-yl)-4-(1,1,3,3-tetramethylbutyl)-phenol (CYASORB™-5411); 2-hydroxy-n-octyloxybenzophenone (CYASORB™531); 2-[4,6-bis(2,4-dimethylphenyl)-1,3,5-triazin-2-yl]-5-(octyloxy)-phenol (CYASORB™1164); 2,2'-(1,4-phenylene)bis(4H-3,1-benzoxazin-4-one) (CYASORB™, UV-3638); 1,3-bis[[(2-cyano-3,3-diphenylacryloyl)oxy]-2,2-bis[[(2-cyano-3,3-diphenyl-acryloyl)oxy]methyl] propane (UVINUL™, 3030); 2,2'-(1,4-phenylene) bis(4H-3,1-benzoxazin-4-one); 1,3-bis[(2-cyano-3,3-diphenylacryloyl)oxy]-2,2-bis[[(2-cyano-3,3-diphenyl-acryloyl)oxy]methyl]propane; nano-size inorganic materials such as titanium oxide, cerium oxide, and zinc oxide, all with particle size less than 100 nanometers; or the like, or combinations including at least, one of the foregoing UV absorbers. UV absorbers are generally used in amounts of from 0.01 to 3.0 parts by weight, based on 100 parts by weight based on 100 parts by weight of the total composition, excluding any filler.

Suitable lubricants include for example, fatty acid esters such as alkyl stearyl esters, e.g., methyl stearate or the like; mixtures of methyl stearate and hydrophilic and hydrophobic surfactants including polyethylene glycol polymers, polypropylene glycol polymers, and copolymers thereof e.g., methyl stearate and polyethylene-polypropylene glycol copolymers in a suitable solvent; or combinations including at least one of the foregoing lubricants. Lubricants are generally used in amounts of from 0.1 to 5 parts by weight, based on 100 parts by weight of the total composition, excluding any filler.

Suitable pigments include for example, inorganic pigments such as metal oxides and mixed metal oxides such as zinc oxide, titanium dioxides, iron oxides or the like; sulfides such as zinc sulfides, or the like; aluminates; sodium sulfo-silicates; sulfates and chromates; zinc ferrites; ultramarine blue; Pigment Brown 24; Pigment Red 101; Pigment Yellow 119; organic pigments such as azos, di-azos, quinacridones, perylenes, naphthalene tetracarboxylic acids, flavanthrones, isoindolinones, tetrachloroisoindolinones, anthraquinones, anthanthrones, diaxazines, phthalocyanines, and azo lakes; Pigment Blue 60, Pigment Red 112, Pigment Red 149, Pigment Red 177, Pigment Red 179, Pigment Red 202, Pigment Violet 29, Pigment Blue 15, Pigment Green 7, Pigment Yellow 147 and Pigment Yellow 150, or combinations including at least one of the foregoing pigments. Pigments are generally used in amounts of from 1 to 10 parts by weight, based on 100 parts by weight based on 100 parts by weight of the total composition, excluding any filler.

Suitable dyes include, for example, organic dyes such as coumarin 460 (blue), coumarin 6 (green), nile red or the like; lanthanide complexes; hydrocarbon and substituted hydrocarbon dyes; polycyclic aromatic hydrocarbons; scintillation dyes (preferably oxazoles and oxadiazoles); aryl- or heteroaryl-substituted poly (2-8 olefins); carbocyanine dyes;

phthalocyanine dyes and pigments; oxazine dyes; carbostyryl dyes; porphyrin dyes; acridine dyes; anthraquinone dyes; arylmethane dyes; azo dyes; perinone dyes; bis-benzoxazolylthiophene (BBOT); and xanthene dyes; fluorophores such as anti-stokes shift dyes which absorb in the near infrared wavelength and emit in the visible wavelength, or the like; luminescent dyes such as 5-amino-9-diethyliminobenzo(a)phenoxazonium perchlorate; 7-amino-4-methylcarbostyryl; 7-amino-4-methylcoumarin; 3-(2'-benzimidazolyl)-7-N,N-diethylaminocoumarin; 3-(2'-benzothiazolyl)-7-dietylaminocoumarin; 2-(4-biphenylyl)-5-(4-t-butylphenyl-1,3,4-oxadiazole; 2-(4-biphenyl)-6-phenylbenzoxazole-1,3; 2,5-Bis-(4-biphenylyl)-1,3,4-oxadiazole; 2,5-bis-(4-biphenylyl)-oxazole; 4,4'-bis-(2-butyloctyloxy)-p-quaterphenyl; p-bis(o-methylstyryl)-benzene; 5,9-diaminobenzo(a)phenoxazonium perchlorate; 4-dicyanomethylene-2-methyl-6-(p-dimethylaminostyryl)-4H-pyran; 1,1'-diethyl-2,2'-carbocyanine iodide; 3,3'-diethyl-4,4',5,'-dibenzothiatricarbocyanine idodide; 7-diethylamino-4-methylcoumarin; 7-diethyamino-4-trifluoromethylcoumarin; 2,2'-dimethyl-p-quaterphenyl; 2,2-dimethyl-p-terphenyl 7-ethylamino-6-methyl-4-trifluoromethylcourmarin; 7-ethylamino-4-trifluoromethylcoumarin; nile red; rhodamine 700; oxazine 750; rhodamine 800; IR 125; IR 144; IR 140; IR 132; IR 26; IR5; diphenylhexatriene; diphenylbutadiene; tetrphenylbutadiene; naphthalene; anthracene; 9,10-diphenylanthracene; pyrene; chrysene; rubrene; coronene; phenathrene or the like, or combinations including at least one of the foregoing dyes. Dyes are generally used in amounts of from 0.1 to 5 parts by weight, based on 100 parts by weight of the total composition, excluding any filler.

Suitable colorants include, for example titanium dioxide, anthraquinones, perylenes, perinones, indanthrones, quinacridones, xanthenes, oxazines, oxazolines, thioxathenes, indigoids, thioindigoids, naphthalimides, cyanines, xanthenes, methines, lactones, coumarins, bis-benzoxazolylthiophene (BBOT), naphthalenetetracarboxylic derivatives, monoazo and diazo pigments, triarylmethanes, aminoketones, bis(styryl)biphenyl derivatives, and the like, as well as combinations including at least one of the foregoing colorants. Colorants are generally used in amounts of from 0.1 to 5 parts by weight, based on 100 parts by weight of the total composition, excluding any filler.

Suitable blowing agents include for example, low boiling halohydrocarbons and those that generate carbon dioxide; blowing agents that are solid at room temperature and when heated to temperatures higher than their decomposition temperature, generate gases such as nitrogen, carbon dioxide, ammonia gas, such as azodicarbonamide, metal salts of azodicarbonamide, 4,4' oxybis(benzenesulfonylhydrazide), sodium bicarbonate, ammonium carbonate, or the like, or combinations including at least one of the foregoing blowing agents. Blowing agents are generally used in amounts of from 1 to 20 parts by weight, based on 100 parts by weight of the total composition, excluding any filler.

Additionally, materials to improve flow and other properties can be added to the composition, such as low molecular weight hydrocarbon resins or dendritic polyols (such as Boltorn from Perstop) or dendritic polyesteramides (such as Hybrane™ from DSM). Particularly useful classes of low molecular weight hydrocarbon resins are those derived from petroleum C5 to C9 feedstock that are derived from unsaturated C5 to C9 monomers obtained from petroleum cracking. Non-limiting examples include olefins, e.g., pentenes, hexenes, heptenes and the like; diolefins, e.g. pentadienes, hexadienes and the like; cyclic olefins and diolefins, e.g. cyclopentene, cyclopentadiene, cyclohexene, cyclohexadiene, methyl cyclopentadiene and the like; cyclic diolefin dienes, e.g., dicyclopentadiene, methylcyclopentadiene dimer and the like; and aromatic hydrocarbons, e.g., vinyltoluenes, indenes, methylindenes and the like. The resins can additionally be partially or fully hydrogenated.

Examples of flame retardants include, but are not limited to, halogenated flame retardants, like tretabromo bisphenol A oligomers such as BC58 and BC52, brominated polystyrene or poly(dibromo-styrene), brominated epoxies, decabromodiphenyleneoxide, pentabrombenzyl acrylate monomer, pentabromobenzyl acrylate polymer, ethylene-bis (tetrabromophthalimide, bis(pentabromobenzyl)ethane, metal hydroxides like $Mg(OH)_2$ and $Al(OH)_3$, melamine cyanurate, phosphor based FR systems like red phosphorus, melamine polyphosphate, phosphate esters, metal phosphinates, ammonium polyphosphates, expandable graphites, sodium or potassium perfluorobutane sulfate, sodium or potassium perfluorooctane sulfate, sodium or potassium diphenylsulfone sulfonate and sodium- or potassium-2,4,6-trichlorobenzoate and N-(p-tolylsulfonyl)-p-toluenesulfimide potassium salt, N-(N'-benzylaminocarbonyl)sulfanylimide potassium salt, or a combination containing at least one of the foregoing. Fillers and additives can be added in amounts ranging from 0.1 to about 40% by weight percent of the total composition.

The thermoplastic compositions of the present invention can be readily formed using any known method in the art of dispersing one or more fillers in a thermoplastic resin. The thermally conductive and electrically insulative compositions or composites can generally be processed by a melt compounding process or solution blending process.

Melt blending of the moldable composition involves the use of shear force, extensional force, compressive force, ultrasonic energy, electromagnetic energy, thermal energy or combinations comprising at least one of the foregoing forces or forms of energy and is conducted in processing equipment wherein the aforementioned forces or forms of energy are exerted by a single screw, multiple screws, intermeshing co-rotating or counter rotating screws, non-intermeshing co-rotating or counter rotating screws, reciprocating screws, screws with pins, screws with screens, barrels with pins, rolls, rams, helical rotors, or combinations comprising at least one of the foregoing.

Melt blending involving the aforementioned forces can be conducted in machines such as single or multiple screw extruders, Buss kneader, Henschel, helicones, Ross mixer, Banbury, roll mills, molding machines such as injection molding machines, vacuum forming machines, blow molding machine, or the like, or combinations comprising at least one of the foregoing machines.

In one embodiment, the organic polymer in powder form, pellet form, sheet form, or the like, can be first dry blended with the fillers in a Henschel or in a roll mill, prior to being fed into a melt blending device such as an extruder or Buss kneader. It can be desirable to introduce the fillers into the melt blending device in the form of a masterbatch. In such a process, the masterbatch can be introduced into the melt blending device downstream of the point where the organic polymer is introduced.

A melt blend is one where at least a portion of the organic polymer has reached a temperature greater than or equal to about the melting temperature, if the resin is a semi-crystalline organic polymer, or the flow point (e.g., the glass transition temperature) if the resin is an amorphous resin during the blending process. A dry blend is one where the entire mass of organic polymer is at a temperature less than or equal to about the melting temperature if the resin is a semi-crystalline organic polymer, or at a temperature less than or equal to the flow point if the organic polymer is an amorphous resin and wherein organic polymer is substantially free of any liquid-like fluid during the blending process. A solution blend, as defined herein, is one where the organic polymer is suspended in a liquid-like fluid such as, for example, a solvent or a non-solvent during the blending process.

The moldable composition comprising the organic polymer and fillers can be subject to multiple blending and forming steps if desirable. For example, the moldable composition can first the extruded and formed into pellets. The pellets can then be fed into a molding marching where it can be formed into any desirable shape or product. Alternatively, the moldable composition emanating from a single melt blender can be formed into sheets or strands and subjected to post-extrusion processes such as annealing, uniaxial or biaxial orientation.

In one aspect, the fillers can first be dry blended together with any foregoing mentioned additives, then fed into an extruder from one or multi-feeders, or fillers separately feed into extruder from one or multi-feeders. The organic polymer resin or any polymer combination can be, in one aspect, in powder of pellet form, and can be first dry blended with each other, or dry blended with any combination of the foregoing mentioned fillers, then fed into an extruder from one or multiple-feeders. The fillers used in the invention can also be first processed into a masterbatch, and then fed into an extruder.

The feeding of organic polymers, fillers, masterbatch or any combination of polymers, fillers blends can be fed into an extruder from a throat hopper or any side feeders on the extruder.

The extruders used in the invention can have a single screw, multiple screws, intermeshing co-rotating or counter rotating screws, non-intermeshing co-rotating or counter rotating screws, reciprocating screws, screws with pins, screws with screens, barrels with pins, rolls, rams, helical rotors, or combinations comprising at least one of the foregoing. The melt blending of the composites involves the use of shear force, extensional force, compressive force, ultrasonic energy, electromagnetic energy, thermal energy or combinations comprising at least one of the foregoing forces or forms of energy.

The barrel temperature on the extruder during compounding can be set at the temperature where at least a portion of the organic polymer has reached a temperature greater than or equal to about the melting temperature, if the resin is a semi-crystalline organic polymer, or the flow point (e.g., the glass transition temperature) if the resin is an amorphous resin.

Solution blending can also be used to manufacture the moldable composition. The solution blending can also use additional energy such as shear, compression, ultrasonic vibration, or the like, to promote homogenization of fillers with the organic polymer. In one embodiment, an organic polymer suspended in a fluid can be introduced into an ultrasonic sonicator along with any foregoing fillers. The mixture can be solution blended by sonication for a time period effective to disperse the fillers into the organic polymers. The organic polymer along with the fillers can then be dried, extruded and molded if desired.

The moldable composition comprising the organic polymer, fillers, and optional additives can be subject to multiple blending and forming steps if desirable. For example, the moldable composition can first be extruded and formed into pellets. The pellets can then be fed into a molding machine where it can be formed into any desirable shape or product. Alternatively, the moldable composition emanating from a single melt blender can also be formed into sheets or strands and subjected to post-extrusion processes such as annealing, uniaxial or biaxial orientation.

The polymeric compositions can be formed into moldable stock material or moldable articles using techniques known to those in the art.

The polymeric compositions and moldable composites display thermally conductive, but electrically insulative properties. In one aspect, the composition is characterized by: (i) a thermal conductivity of at least 1.0 W/mK; and (ii.) a volume resistivity of at least $10^7$ Ohm cm.

In one aspect, the invention herein achieves the surprising result of a high thermally conductive composition by using substantial amount of a low thermally conductive filler, and achieving a final composition thermal conductivity that exceeds the thermal conductivity that one would expect based on the thermal conductivity of the individual components. This means that an unexpected synergetic effect between the different fillers leads to a surprisingly high thermal conductivity of the compositions. Moreover, at the same time, the composition maintains a high level of volume resistivity (i.e., the composition is electrically insulative). The filler combination of the invention typically has a relatively low hardness, which facilitates melt processing. Additionally, the filler combination of the invention typically has a low cost-structure, since the low thermally conductive fillers are relatively low-cost as compared to the high thermally conductive fillers. As a result the compositions of the invention have a high thermal conductivity at a lower-cost structure and/or better processability (less wear) than current commercial compositions.

The compositions of this invention can be formed into an article of manufacture. In one aspect the article can be a molded article. In one aspect, the compositions and articles herein can be used in heat or thermal dissipation management applications where electrical insulation is required. Examples include, but are not limited to, heat sinks for electronic components in computers and consumer electrical appliances, solar cells and batteries such as processors, lamps, LED-lamps, electric motors, electric circuits, the encapsulation of electronics, such as coils or casings, solar cell back sheets, battery casings, or the manufacture of heat exchangers for highly problematic (corrosive) environments. The following non-limiting aspects are illustrative of the technology disclosed herein.

Aspect 1: A composition, comprising: (a) from about 20 wt % to about 99 wt % of one or more thermoplastic polymers; (b) from about 0.5 to about 50 wt % expandable graphite platelets, the expandable graphite platelets having a thickness of greater than about 1 micrometer; and (c) from about 0 wt % to about 60 wt % of one or more additives, the percentages by weight being based on each case on the total weight of components (a), (b), and (c) and together giving 100 wt %. The composition may have an in-plane thermal conductivity in the range of from about 1 to about 30 W/mK.

It should be understood that some embodiments of the disclosed compositions may include graphite in a form other than expandable graphite; expandable graphite is not the exclusive graphite form for the disclosed compositions. In embodiments that do not use expandable graphite, through-plane thermal conductivity for insulative compositions may be in the range of about 0.5 to 2 W/mK and in the range of from about 0.5 to about 5 W/mK for electrically conductive compositions.

It should be understood that any of the disclosed compositions may, in some embodiments, include graphite in expandable and graphite in one or more other forms. As some examples, commercial grades like Konduit PX08321, OX10324, which use normal flake like non-expandable graphite (e.g., graphite 2012 and graphite 1125) may be present in the disclosed composition. Non-expandable graphite (which graphite does not expand under heating) may be used. In embodiments that include additional graphite besides expandable graphite, that additional graphite may represent from about 0.5 to about 90 wt % of the composition, including any and all intermediate values.

In some embodiments that use expandable graphite, the through-plane thermal conductivity may be in the range of from about 0.5 to 3 W/mK for insulative compositions and in the range of from about 0.5 to about 10 W/mK for electrically conductive compositions.

In some embodiments, at least some of the expandable graphite platelets may have a thickness in the range of greater than about 0.1 micrometer, greater than about 0.5 micrometers, greater than about 0.6 micrometers, or greater than about 0.9 micrometers. For example, platelets may have a thickness in the range of from about 0.1 micrometers up to about 100 micrometers, e.g., 1-90 micrometers, 5-70 micrometers, 10-50 micrometers, or even 20-40 micrometers.

Aspect 2: The composition of Aspect 1, wherein at least one additive comprises at least one low thermally conductive filler having a thermal conductivity in the range of from about 10 to about 30 W/mK, the at least one low thermally conductive filler being present at from more than about 10 wt % to about 60 wt %.

Aspect 3: The composition of any of Aspects 1-2, wherein at least one additive comprises at least one high thermally conductive filler having a thermal conductivity in the range of greater than about 50 W/mK, the at least one high thermally conductive filler being present at from more than about 10 wt % to about 60 wt %.

Aspect 4: The composition of any of Aspects 1-3, wherein at least one additive comprises AlN, $Al_4C_3$, $Al_2O_3$, BN, AlON, $MgSiN_2$, SiC, $Si_3N_4$, graphite expanded graphite, ZnS, CaO, MgO, ZnO, TiO2, $CaCO_3$, mica, BaO, $BaSO_4$, $CaSiO_3$, ZrO2, $SiO_2$, glass beads, $MgO.xAl_2O_3$, $CaMg(CO_3)_2$, ceramic-coated graphite, clay, talc, $CaSO_4$ or any combination thereof.

Aspect 5: The composition of any of Aspects 1-4, wherein at least one additive comprises a reinforcement.

Aspect 6: The composition of Aspect 5, wherein the reinforcement comprises glass fiber, carbon fiber, metal (e.g., metal wire), or any combination thereof.

Aspect 7: The composition of any of Aspects 1-6, wherein at least one additive comprises an alkaline material.

Aspect 8: The composition of any of Aspects 1-7, wherein the alkaline material is present at greater than about 10 wt %.

Aspect 9: The composition of any of Aspects 1-8, wherein at least one additive comprises a flame retardant, a pigment, a processing additive, a flow promoter, a de-molding agent, a thermal stabilizer, a light stabilizer, a UV-absorbent, or any combination thereof.

Aspect 10: The composition of any of Aspects 1-9, wherein the composition has a density in the range of from about 1.0 to about 2.0 g/cm³ (grams/centimeter³).

Aspect 11: The composition of any of Aspects 1-10, wherein the composition has a volume resistivity of less than $10^7$ Ohm.cm.

Aspect 12: The composition of any of Aspects 1-11, wherein the expandable graphite is characterized as having an expansion temperature of less than about 300 deg. C.

Aspect 13: The composition of any of Aspects 1-12, wherein the composition is characterized as having an in-plane thermal conductivity in the range of from about 1.0 to about 30 W/mK.

Aspect 14: The composition of any of Aspects 1-13, wherein the composition is characterized as having a through-plane thermal conductivity in the range of from about 0.5 to about 10 W/mK.

Aspect 15: A molded article, comprising: from about 20 wt % to about 99 wt % of one or more thermoplastic polymers; from about 0.5 to about 50 wt % expandable graphite platelets, the expandable graphite platelets having a thickness of greater than about 1 micrometer; and from about 0 wt % to about 60 wt % of one or more additives, the molded article also having an in-plane thermal conductivity in the range of from about 1.0 to about 30 W/mK, the percentages by weight being based in each case on the total weight of components (a), (b), and (c), and together giving 100 wt %.

Aspect 16: The molded article of Aspect 15, wherein the molded article has a through-plane thermal conductivity in the range of from about 0.5 to about 10 W/mK.

Aspect 17: The molded article of any of Aspects 15-6, wherein the molded article has a density in the range of from about 1.0 to about 2.0 g/cm³.

Aspect 18: The molded article of any of Aspects 15-17, wherein at least one additive comprises at least one low thermally conductive filler having a thermal conductivity in the range of from about 10 to about 30 W/mK, the at least one low thermally conductive filler being present at from more than about 10 wt % to about 60 wt %.

Aspect 19: The molded article of any of Aspects 15-18, wherein at least one additive comprises at least one high thermally conductive filler having a thermal conductivity in the range of greater than about 50 W/mK, the at least one high thermally conductive filler being present at from more than about 10 wt % to about 60 wt %.

Aspect 20: A method of preparing a composition, comprising (a) from about 20 wt % to about 99 wt % of one or more thermoplastic polymers; (b) from about 0.5 to about 50 wt % expandable graphite platelets, the expandable graphite platelets having a thickness of greater than about 1 micrometer; and (c) from about 0 wt % to about 60 wt % of one or more additives, the method comprising mixing in an extruder melts of (a), (b), and (c), wherein at least a portion of (b) is provided to the extruder at a point beyond which—when viewed in the conveying direction—the extruder comprises one or more shearing elements, and the percentages by weight being based in each case on the total weight of components (a), (b), and (c) and together giving 100 wt %.

Aspect 21: The method of Aspect 20, wherein (1) at least one additive comprises at least one low thermally conductive filler having a thermal conductivity in the range of from about 10 to about 30 W/mL and present at from more than about 10 wt % to about 60 wt %, wherein (2) at least one additive comprises at least one high thermally conductive filler having a thermal conductivity in the range of greater than about 50 W/mK and present at from more than about 10 wt % to about 60 wt %, or both (1) and (2).

Aspect 22: A method of using a thermoplastic composition, comprising contacting the composition of any of Aspects 1-14 to an elevated temperature.

Aspect 23: A method of using a molded article, comprising contacting the molded article of any of Aspects 15-19 to an elevated temperature.

Exemplary Embodiments

To prepare the disclosed compositions, a polymer (including the foregoing polymers) or polymers may be first dry blended with each other, or dry blended with fillers or additives. The materials may then be fed into, e.g., a twin-screw extruder from one or multi-feeders. Alternatively, one may separately feed into an extruder from one or multi-feeders. A thermoplastic polymer may be fed into an extruder from the main throat position, while other polymers are fed into extruder from downstream positions.

Expandable graphite may be fed into an extruder at the throat or at side-feeding positions using normal loss-in-weight feeding feeders. Expandable graphite may be fed into the extruder separately, or pre-blended with other components in the compositions and fed into extruder. It should be understood that the term "expandable graphite" may refer to graphite that is in expandable form and/or to graphite that was in expandable form and was then further processed by heating, mixing, extrusion, or other processes. As an example, expandable graphite may refer to graphite in the form of platelets, flakes, or other shapes that is expandable under certain heat, chemical, or other processing conditions so as to increase volume and to form graphite with a decreased graphite layer thickness, which material may then in turn processed by heating, mixing, extrusion, or other processes. Expandable graphite may refer to graphite that has been heated so as to expand.

A feed enhancement device may be used in the feeding zone, which zone may be equipped with a porous, gas permeable wall section to which a vacuum is applied externally. Intermediate particle air may be sucked out of the powdered bulk material through this section. Thus compacting of loose material is obtained, and feeding capacity was raised accordingly.

Other fillers or reinforcing agents and any other additives may also be dry blended together, then fed into extruder from one or multi-feeders, or separately feed into extruder from one or multi-feeders. Fillers may also be processed into a master batch, and then feed into an extruder. The components could also be injected into extruder if in liquid form.

One exemplary extruder is an intermeshing co-rotating twin-screw extruder. Melt blending of the composites involves the use of shear force, extensional force, compressive force, thermal energy or combinations comprising at least one of the foregoing forces or forms of energy.

The barrel temperature on the extruder during compounding may be set to a temperature where at least a portion of the organic polymer reaches a temperature greater than or equal to about the melting temperature, if the resin is a semi-crystalline organic polymer, or the flow point (e.g., the glass transition temperature) if the resin is an amorphous resin. The melt temperature may be increased above the initial expansion temperature of the expandable graphite during compounding.

The moldable composition comprising the foregoing polymer and fillers may be subject to multiple blending and forming steps. As one example, the moldable composition may first be extruded and formed into pellets. The pellets may then be fed into a molding machine where it may be formed into any desirable shape or product. Alternatively, the moldable composition emanating from a single melt blender may be formed into sheets or strands and subjected to post-extrusion processes such as annealing, uniaxial or biaxial orientation.

In one exemplary embodiment, samples were prepared using a twin screw extruder (WP ZSK26MC with L/D=40) Pellets extruded from extruder were then injection molded into 80*10*3 mm bars and cut into 10*10*3 mm square sample for through plane thermal conductivity measurement, Φ100*0.4 mm sheet and cut into Φ25*0.4 mm round samples for in plane thermal conductivity measurement.

Thermal conductivity (κ, W/m-K), was measured by Nanoflash LFA447 using a phyroceram reference with similar thickness. The measurement determines the thermal diffusivity ($\alpha$, cm2/s) (centimeters$^2$/second) and the specific heat (Cp, J/g-K) (joules/gram-degree Kelvin) of the sample, together with the density ($\rho$, g/cm3), which is measured using a water immersion method (ASTM D792), the product of three value gives the thermal conductivity in the through plane direction and in plane direction, according to: $\kappa = \alpha(T) Cp(T)\rho(T)$. Each point was repeated three times to make sure the accurate TC was measured.

Figure 1:
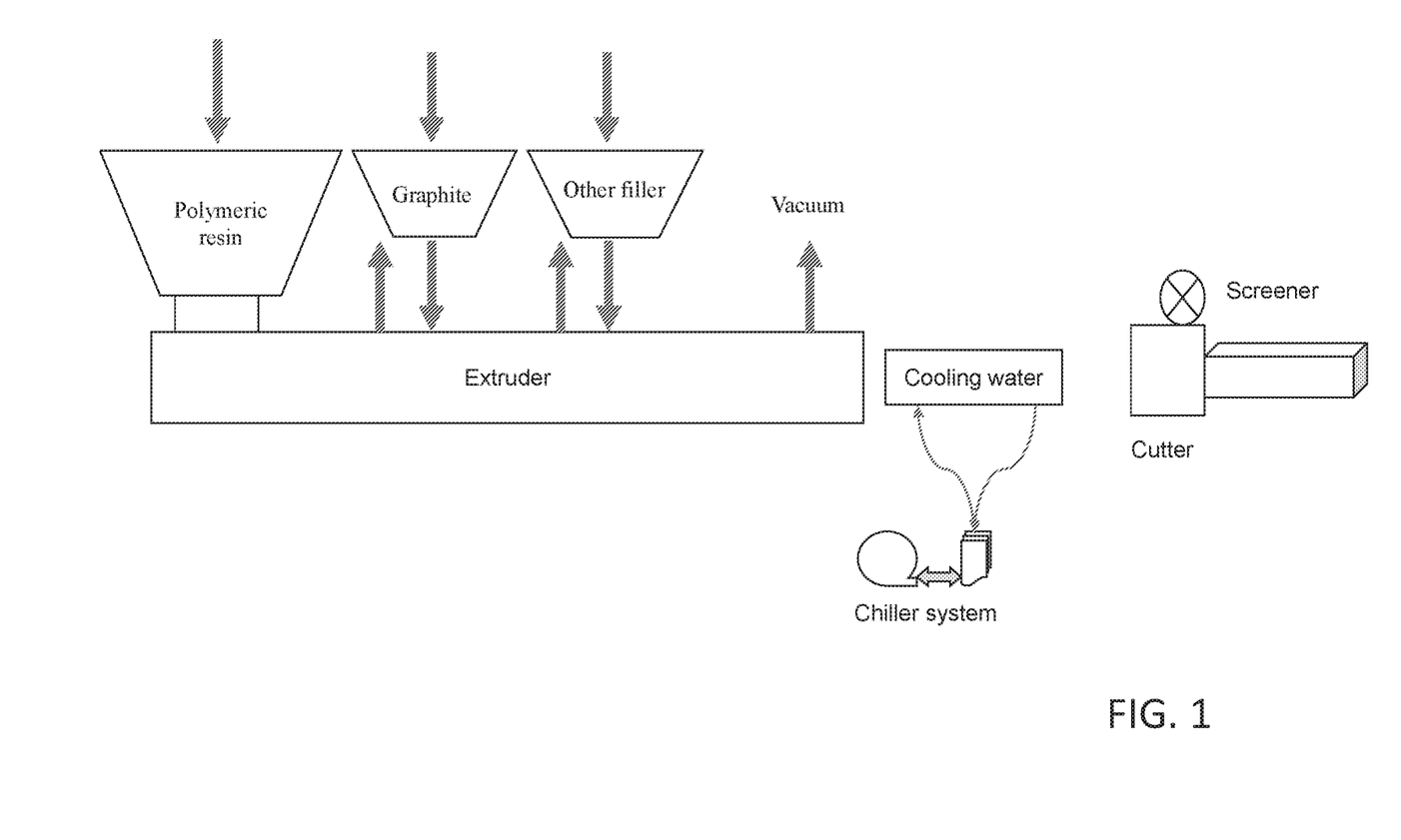
FIG. 1 depicts an exemplary extruder, including an exemplary twin-screw extruder compounding line.

FIG. 1 shows an exemplary twin-screw extruder compounding line setup. As FIG. 1 shows, polymeric resin is fed from the main throat position and expandable graphite is fed from an upstream side feeder, which is capable of upstream venting. Other components are fed from a further downstream position, which may be used as a downstream venting from its own side-feeder. Vacuum venting may be situated near the end of the extruder.

Table 1 below provides exemplary material for the disclosed compositions. Different graphites were chosen to show comparison and different feature of expandable graphite (EG) from other normal graphite and exfoliated graphite in terms of graphite powder feeding, expansion, de-gassing and dispersion during compounding, and the resultant thermal conductive performance.

TABLE 1

Materials list in the examples

| Component | Chemical description | Source |
|---|---|---|
| Ultramid B27 | Nylon 6 (PA6) [CAS: 25038-54-4] | BASF |
| Graphite 2012 | Graphite [CAS: 7782-42-5] | Asbury |
| Graphite 1125 | Graphite [CAS: 7782-42-5] | Asbury |
| Graphite GFG50 | Exfoliated Graphite [CAS: 7782-42-5] | SGL |
| Expandable Graphite (EG) | Graphite ADT KP251 [CAS: 7782-42-5] | Shijiazhuang ADT Carbonic Material Factory (China) |
| Magnifin H-5 IV | Mg(OH)2 [CAS: 1309-42-8] | Martinswerk |

Table 2 shows the parameters of a compounding twin-screw extruder that was used for preparation of examples.

TABLE 2

Parameters of the twin-screw extruder

| Extruder | Variable Screw diameter (mm) | Variable L/D | Variable Total barrel number |
|---|---|---|---|
| WP ZSK26MC | 26 | 40.0 | 10 |

Figure 2:
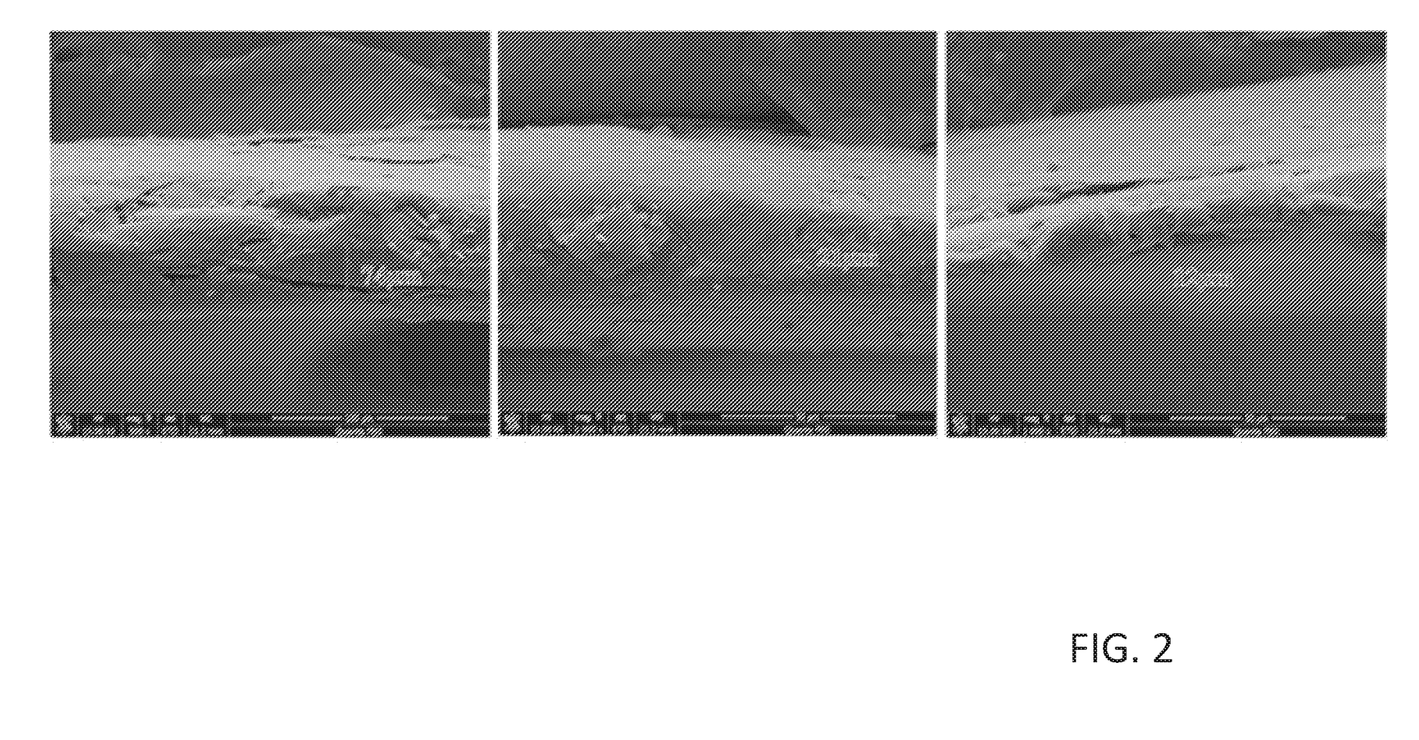
FIG. 2 illustrates exemplary graphite morphology, including expandable graphite morphology and typical laminar thickness.

Table 3 below shows the properties of EG that was used for example preparation. FIG. 2 shows the EG morphology and its thickness.

TABLE 3

EG ADT KP251 properties

| Initial Expansion temperature (° C.) | Expansion ratio (ml/g) | Pure SG (g/ml) | Tap density (g/ml) |
|---|---|---|---|
| 150 | 230 | 2.26 | 0.75 |

Table 4 below compares the thermal conductive performance of the compositions using a normal flake like graphite 1125 and an expandable graphite (EG). One can see with 10 wt % of graphite in the composition, the composition that includes EG shows a thermal conductivity increment by over 50% relative to that using normal graphite

TABLE 4

Comparison of composites thermal conductivity by using 10 wt % of graphite:

| Item Description | Unit | #1 | #2 |
|---|---|---|---|
| Ultramid B27 | % | 90 | 90 |
| Graphite 1125 | % | 10 | |
| Expandable Graphite (EG) | % | | 10 |
| Formulation Total | | 100 | 100 |
| Density-Avg | — | 1.19 | 1.22 |
| Through plane Thermal conductivity | W/(m · K) | 0.50 | 1.07 |
| In plane Thermal conductivity | W/(m · K) | 1.18 | 1.85 |
| Through plane TC increment | % | 0 | 114.4 |
| In-plane TC increment | % | 0 | 56.9 |

Table 5 shows the effect of increasing graphite loading to 20 wt % in the composition. One can see that the composition using EG (expandable graphite) shows an increasing thermal conductivity increment, up to 158% for in-plane thermal conductivity, which is higher than the composition using an expanded (exfoliated) graphite GRG50.

TABLE 5

Other examples comparing thermal conductivity of composites by using 20 wt % of graphite

| Item Description | Unit | #3 | #4 | #5 | #6 |
|---|---|---|---|---|---|
| Ultramid B27 | % | 80 | 80 | 80 | 80 |
| Graphite 2012 | % | 20 | | | |
| Graphite 1125 | % | | 20 | | |
| Graphite GFG50 | % | | | 20 | |
| Expandable Graphite (EG) | % | | | | 20 |
| Formulation Total | | 100 | 100 | 100 | 100 |
| Density-Avg | — | 1.26 | 1.28 | 1.20 | 1.23 |
| Through plane Thermal conductivity | W/(m · K) | 0.82 | 0.90 | 1.24 | 1.83 |
| In plane Thermal conductivity | W/(m · K) | 1.60 | 1.73 | 1.94 | 4.46 |
| Through plane TC increment | % | — | 0 | 38.2 | 103.7 |
| In plane TC increment | % | — | 0 | 12.6 | 158.3 |

Table 6 shows the effect of adding another filler (Mg(OH)$_2$) apart from the 10 wt % of graphite. One may see that the composition using EG still shows a thermal conductivity increase over those compositions using normal flake like graphite 1125 and exfoliated graphite GFG50.

TABLE 6 other examples comparing thermal conductivity of composites by combing graphite with Mg(OH)$_2$

| Item Description | Unit | #7 | #8 | #9 |
|---|---|---|---|---|
| Ultramid B27 | % | 40 | 40 | 40 |
| Graphite 1125 | % | 10 | | |
| Graphite GFG50 | % | | 10 | |
| Expandable Graphite (EG) | % | | | 10 |
| Magnifin H-5 IV | % | 50 | 50 | 50 |
| Formulation Total | | 100 | 100 | 100 |
| Density-Avg | — | 1.60 | 1.60 | 1.63 |
| Through plane Thermal conductivity | W/(m · K) | 1.44 | 1.72 | 1.70 |
| In plane Thermal conductivity | W/(m · K) | 2.42 | 2.65 | 3.11 |
| Through plane TC increment | % | — | 19.5 | 17.9 |
| In plane TC increment | % | — | 9.8 | 28.8 |

Figure 3:
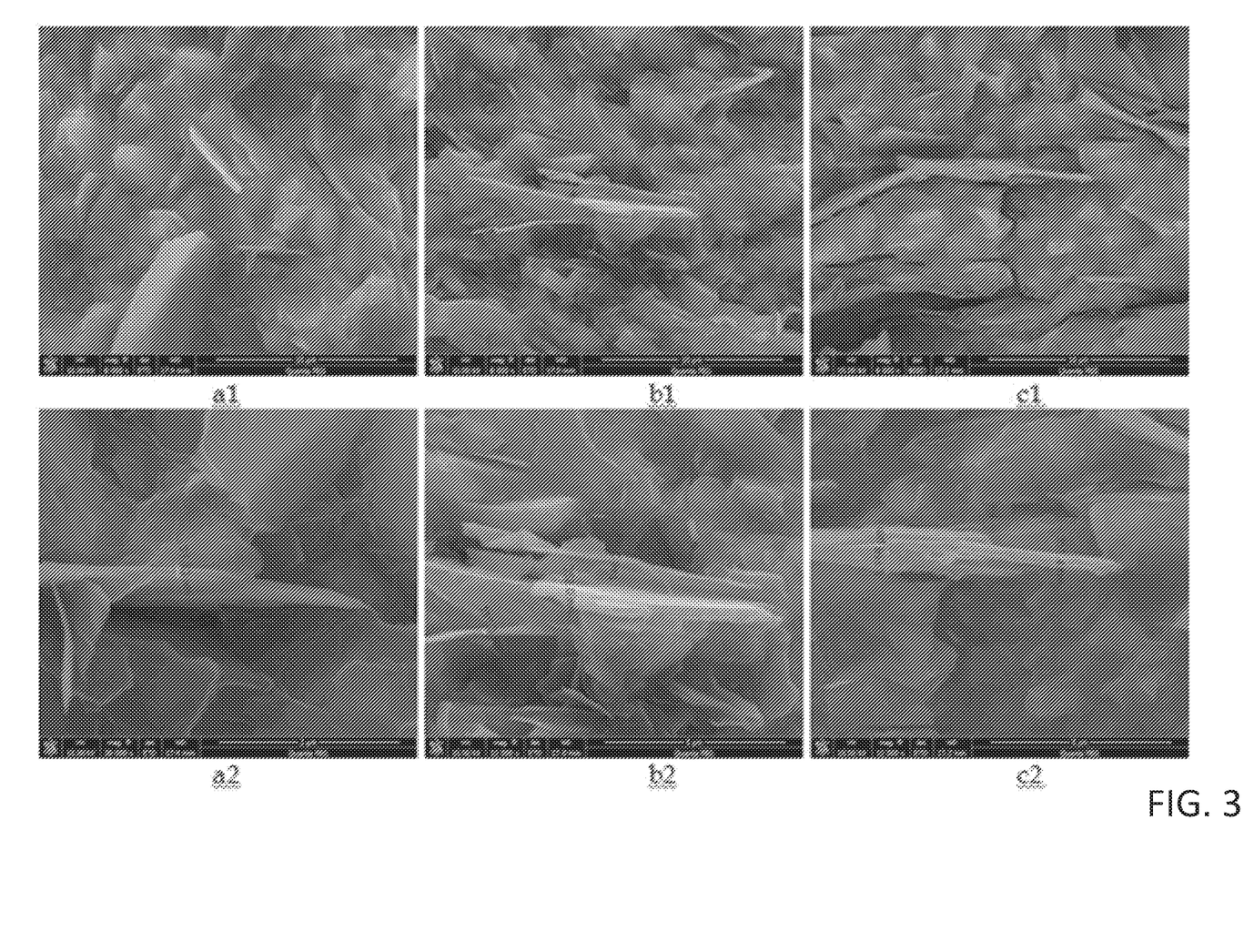
FIG. 3 illustrates non-limiting compositions, including graphite morphology after compounding. a1 (x6000) a2 (x30000) #7 using graphite 1125, b1 (x6000) b2 (x12000) #8 using exfoliated Conductograph™ graphite GFG50, c1 (x6000) c2 (x12000) #9 using expandable graphite (EG) Nyacol™ KP251.

FIG. 3 shows the graphite morphology in final compounds. One can see that regardless of the thickness of original graphite before compounding, the thickness after compounding may be smaller. As seen from the SEM picture measurement, the graphites in example #7, #8 and #9 show thickness of less than 500 nm. A larger layer thickness expandable graphite over 1 micrometer exists in #9.

Overall, thermal conductivity increased in an unexpectedly superior way by using expandable graphite (also referred to as EG in some places) in the composition. After graphite expansion and exfoliation during compounding, the resulting composition shows an improved thermal conductivity performance over compositions that use normal flake like graphite or even those that use exfoliated graphite.

What is claimed:

1. A composition, comprising:
   (a) from about 20 wt % to about 99 wt % of one or more thermoplastic polymers;
   (b) from about 0.5 to about 50 wt % of a processed expandable graphite derived from expandable graphite, wherein the processed expandable graphite has a thickness less than 1 micron; and
   (c) from greater than 0 wt % to about 60 wt % of one or more additives,
   the percentages by weight being based in each case on the total weight of components (a), (b), and (c) and together giving 100 wt %.

2. The composition of claim 1, wherein the at least one additive further comprises at least one low thermally conductive filler having a thermal conductivity in the range of from about 10 to about 30 W/mK, the at least one low thermally conductive filler being present in an amount of from about 10 wt % to about 60 wt %.

3. The composition of claim 1, wherein at least one additive comprises at least one high thermally conductive filler having a thermal conductivity in the range of greater than about 50 W/mK, the at least one high thermally conductive filler being present in an amount of from about 10 wt % to about 60 wt %.

4. The composition of claim 1, wherein at least one additive comprises AlN, Al4C3, BN, AlON, MgSiN2, SiC, Si3N4, graphite, expanded graphite, ZnS, CaO, MgO, ZnO, TiO2, CaCO3, mica, BaO, BaSO4, CaSiO3, CaSO$_4$, ZrO2, SiO2, glass beads, MgO.xAl2O3, CaMg(CO3)2, ceramic-coated graphite, clay, talc or any combination thereof.

5. The composition of claim 1, wherein at least one additive comprises a reinforcement.

6. The composition of claim 5, wherein the reinforcement comprises glass fiber, carbon fiber, or any combination thereof.

7. The composition of claim 1, wherein at least one additive comprises an alkaline material.

8. The composition of claim 1, wherein at least one additive comprises a flame retardant, a pigment, a processing additive, a flow promoter, a de-molding agent, a thermal stabilizer, a light stabilizer, a UV-absorbent, or any combination thereof.

9. The composition of claim 1, wherein the composition has a volume resistivity of less than $10^7$ Ohm·cm.

10. The composition of claim 1, wherein the expandable graphite is characterized as having an expansion temperature of less than 300° C.

11. The composition of claim 1, wherein the composition[s] is characterized as having an in-plane thermal conductivity in the range of from about 1.0 to about 30 W/mK.

12. The composition of claim 1, wherein the composition[s] is characterized as having a through-plane thermal conductivity in the range of from about 0.5 to about 10 W/mK.

13. A molded article, comprising:
from about 20 wt % to about 99 wt % of one or more thermoplastic polymers;
from about 0.5 to about 50 wt % of a processed expandable graphite derived from expandable graphite, wherein the processed expandable graphite has a thickness less than 1 micron; and
from greater than 0 wt % to about 60 wt % of one or more additives,
the molded article also having an in-plane thermal conductivity in the range of from about 1.0 to about 30 W/mK,
the percentages by weight being based in each case on the total weight of components (a), (b), and (c), and together giving 100 wt %.

14. The molded article of claim 13, wherein the molded article has a through-plane thermal conductivity in the range of from about 0.5 to about 10 W/mK.

15. The molded article of claim 13, wherein at least one additive comprises at least one low thermally conductive filler having a thermal conductivity in the range of from about 10 to about 30 W/mK, the at least one low thermally conductive filler being present in an amount of from about 10 wt % to about 60 wt %.

16. The molded article of claim 13, wherein at least one additive comprises at least one high thermally conductive filler having a thermal conductivity in the range of greater than about 50 W/mK, the at least one high thermally conductive filler being present at in an amount of from about 10 wt % to about 60 wt %.

17. A method of preparing a composition, comprising
(a) from about 20 wt % to about 99 wt % of one or more thermoplastic polymers;
(b) from about 0.5 to about 50 wt % of a processed expandable graphite derived from expandable graphite, wherein the processed expandable graphite has a thickness less than 1 micron; and
(c) from greater than 0 wt % to about 60 wt % of one or more additives, the method comprising mixing in an extruder melts of (a), (b), and (c),
wherein at least a portion of (b) is provided to the extruder at a point beyond which—when viewed in the conveying direction—the extruder comprises one or more shearing elements, and wherein (b) is generated in situ by subjecting the expandable graphite to a process temperature above an initial expansion temperature of the expandable graphite and
the percentages by weight being based in each case on the total weight of components (a), (b), and (c), and together giving 100 wt %.

18. The method of claim 17, wherein (1) at least one additive comprises at least one low thermally conductive filler having a thermal conductivity in the range of from about 10 to about 30 W/mK and present in an amount of from about 10 wt % to about 60 wt %, wherein (2) at least one additive comprises at least one high thermally conductive filler having a thermal conductivity in the range of greater than about 50 W/mK and present in an amount of from about 10 wt % to about 60 wt %, or both (1) and (2).

19. A method of using a thermoplastic composition, the method comprising contacting the composition of claim 1 to an elevated temperature.

20. A method of using a molded article, the method comprising contacting the molded article of claim 13 to an elevated temperature.

* * * * *